(12) United States Patent
Srivastava et al.

(10) Patent No.: US 7,631,074 B1
(45) Date of Patent: Dec. 8, 2009

(54) SYSTEM AND METHOD FOR MANAGING DATA STREAMS

(75) Inventors: Divesh Srivastava, Summit, NJ (US); Nick Koudas, New York, NY (US); Rui Zhang, Normanton Park (SG)

(73) Assignee: AT&T Corp., New York, NY (US)

( * ) Notice: Subject to any disclaimer, the term of this patent is extended or adjusted under 35 U.S.C. 154(b) by 652 days.

(21) Appl. No.: 11/240,518

(22) Filed: Sep. 30, 2005

Related U.S. Application Data

(60) Provisional application No. 60/687,977, filed on Jun. 7, 2005.

(51) Int. Cl.
*G06F 13/00* (2006.01)
(52) U.S. Cl. ...................................... 709/224
(58) Field of Classification Search ............... 709/224
See application file for complete search history.

(56) References Cited

U.S. PATENT DOCUMENTS

| | | | |
|---|---|---|---|
| 6,601,234 B1 | 7/2003 | Bowman-Amuah | |
| 6,775,681 B1 | 8/2004 | Ballamkonda et al. | |
| 6,907,466 B2 | 6/2005 | Alexander, Jr. et al. | |
| 6,925,577 B1 | 8/2005 | Szues et al. | |
| 2003/0187977 A1* | 10/2003 | Cranor et al. | ............... 709/224 |

* cited by examiner

*Primary Examiner*—Robert B Harrell
(74) *Attorney, Agent, or Firm*—Fay Kaplun & Marcin, LLP

(57) ABSTRACT

A system for a data stream management system includes a filter transport aggregate for a high speed input data stream with a plurality of packets each packet comprising attributes. The system includes an evaluation system to evaluate the high speed input data stream and partitions the packets into groups the attributes and a table, wherein the table stores the attributes of each packets using a hash function. A phantom query is used to define partitioned groups of packets using attributes other than those used to group the packets for solving user queries without performing the user queries on the high speed input data stream.

20 Claims, 2 Drawing Sheets

SYSTEM AND METHOD FOR MANAGING DATA STREAMS

CROSS REFERENCE TO RELATED APPLICATIONS

The present application claims priority to U.S. Provisional Patent application Ser. No. 60/687,977 filed on Jun. 7, 2005.

FIELD

The present embodiments relate generally to the problem of efficiently computing multiple aggregations over high speed data streams.

BACKGROUND

Prior approaches to sharing computation for multiple aggregation queries over data streams have used common sub-expression analysis.

A need exists for the identification and maintenance of additional phantoms, especially for the Gigascope architecture. A need exists for a principled approach to the optimized evaluation of multiple aggregation queries, which are very common in data stream management systems. Gigascope currently evaluates multiple aggregation queries independently, with no shared computation. The key difficulty is in identifying the specific phantoms to maintain. The wrong choice in phantoms to maintain would result in additional work with no consequent benefit being gained.

Historically databases store lots of data, in collections of tables, each of which is a set of records. Using query languages such as SQL, information can be combined from multiple tables. More recently, the volume of data that we are able to collect such as IP (Internet Protocol) data, sensor data or other types of data, is so large that the data can't all be stored but one still wants to be able to compute the results of a query over the data.

As an example, consider IP data at the packet level. Each packet was sent at a particular time, from a particular source IP address, and to a particular destination IP address. One user may be interested in finding out how many packets came from a source IP during a specific time interval. The differences these queries are in which combinations of fields they want the information reported on, such as source IP, destination IP, and the like.

The present embodiments meet these needs.

BRIEF DESCRIPTION OF THE DRAWINGS

The detailed description will be better understood in conjunction with the accompanying drawings as follows.

Figure 1:
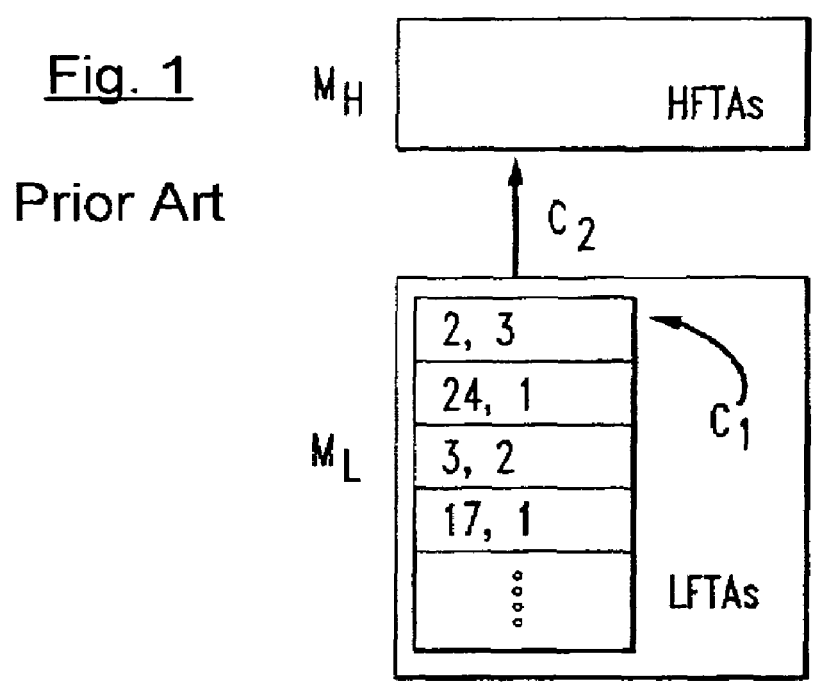
FIG. 1 depicts an abstract model of Gigascope type query architecture.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that it can be practiced or carried out in various ways.

The present embodiments are directed at queries over high speed information that can be processed faster and more cost effectively than performing each query individually. All present embodiments are for a datastream management systems. The datastream management systems comprise a filter transform aggregate, and a high speed input data stream with a plurality of packets, wherein each packet is a record comprising multiple attributes.

The attributes can include a source port for which there are over 65,000 possible values and a source IP for which there are over 1 billion possible values for a total of 65 trillion combinations of values for these two attributes.

The datastream management systems can include an evaluation system to evaluate the high speed input data stream, which partition the packets based on the values of a groups of attributes. The result of the evaluation is maintained in a table, consisting of a record for each combination of values for the group of attributes. A hash function can be used to identify the record corresponding to a particular combination of values. The evaluation system can be an SQL evaluation system, an Oracle evaluation system, or combinations thereof.

The groups of attributes can have like IP addresses and like source ports or combinations thereof. The groups can also be combined by the number of attributes present in each packet and the value of each attribute can be different within the packet. Examples of attributes include source IP addresses, source ports, destination ports, destination IP addresses, time lengths, and combinations thereof.

The datastream management systems can include a phantom query. The phantom query groups packets using attributes other than those used to group the packets for solving user queries without performing the user queries on the high speed input data stream. The phantom query produces a output. The user queries can then be performed on an output from the phantom query. The phantom query can comprise a member selected from the group consisting of a request for source port, a request for destination port, a destination IP, a source IP, and combinations thereof.

The filter transform aggregate can include a low level filter transform aggregate and a high level filter transform aggregate. The filter transform aggregate query processing node can include a low level filter transform aggregate (LFTA) node and a high level filter transform aggregate (LFTA) node. The filter aggregate can includes from about 10,000 packets (low level filter transform aggregate) to about 1,000,000 packets (high level filter transform aggregate).

An embodied method of datastream management entails creating a filter transform aggregate. The filter transform aggregate can include three or more levels of filter transform aggregates. Creating the filter transform aggregate can entail creating a low level filter transform aggregate and a high level filter transform aggregate.

The data stream consists of a plurality of packets, wherein each packet includes one or more attributes. An evaluation is performed on the data stream. The packets are partitioned into groups based on attributes.

The embodied methods continue by creating a table in memory based on the attributes of each packet using a hash function. A phantom query is produced for a defined partitioned group of packets using attributes other than those used to group the packets for solving user queries. By applying the phantom query to the high speed data stream, two or more user queries can be subsequently solved simultaneously. The methods can be used to perform two or more user queries based on the output from the phantom query.

For example, a user might have wanted to look at multiple queries on a high volume data stream; the embodied methods allow a few phantoms to be maintained in order to look at the input stream. The output from the phantom queries can be used to solve the user's queries.

The low level query nodes (or LFTAs) perform simple operations such as selection, projection and aggregation on a high speed stream, greatly reducing the volume of the data that is fed to the high level query nodes (or HFTAs). The HFTAs can then perform more complex processing on the reduced volume (and speed) of data obtained from the LFTA.

The present embodiments compute multiple aggregation queries that differ only in their grouping attributes. The present embodiments can be beneficial to additionally compute and maintain phantoms at the LFTA. Phantoms are fine-granularity aggregation queries that, while not of interest to the user, allow for shared computation between multiple aggregation queries over a high speed data stream.

The present embodiments can be used to investigate the problem of identifying beneficial configurations of phantoms and user-queries in an LFTA.

As an example, a Gigascope from AT&T Labs splits a (potentially complex) query over high speed tuple data streams into two parts: (i) simple low-level queries (at the LFTA) over high speed data streams, which serve to reduce data volumes, and (ii) (potentially complex) high-level queries (at the HFTA) over the low speed data streams seen at the HFTA. LFTAs can be processed on a Network Interface Card (NIC), which has both processing capability and limited memory (a few MBs). HFTAs can be processed in a host machine's main memory, which can be hundreds of MB to several GB.

A single aggregation query Q0 can be processed in Gigascope by considering a data stream relation R (for example, IP packet headers) four attributes A, B, C, and D (for example source IP, source port, destination IP, destination port), in addition to a time attribute.

With reference to the figures, FIG. 1 depicts an abstracted model of Gigascope. $M_L$ corresponds to the LFTA, and $M_H$ corresponds to the HFTA. Q0 is processed in Gigascope as follows. When a data stream record in R arrives, the data stream record is observed at $M_L$. $M_L$ maintains a hash table consisting of a specified number of entries. Each entry is a {group, count} pair. Each group identifies the most recently observed group that hashes to this entry and count keep track of the number of times that group has been recently observed without observing other groups that hash to the same entry.

Since $M_H$ has much more space and a much reduced volume of data to process, processing at $M_H$ does not dominate the total cost. The overall bottlenecks are the cost of looking up the hash table in $M_L$, and possible update in case of a collision. This whole operation, called a probe, has a nearly constant cost $c_1$.

The operation of transferring an entry from M_L to M_h, called an eviction, has a nearly constant cost $c_2$. Usually, $c_2$ is much higher than $c_1$ because the transfer from $M_L$ to $M_H$ is more expensive than a probe in $M_L$.

Figure 2:
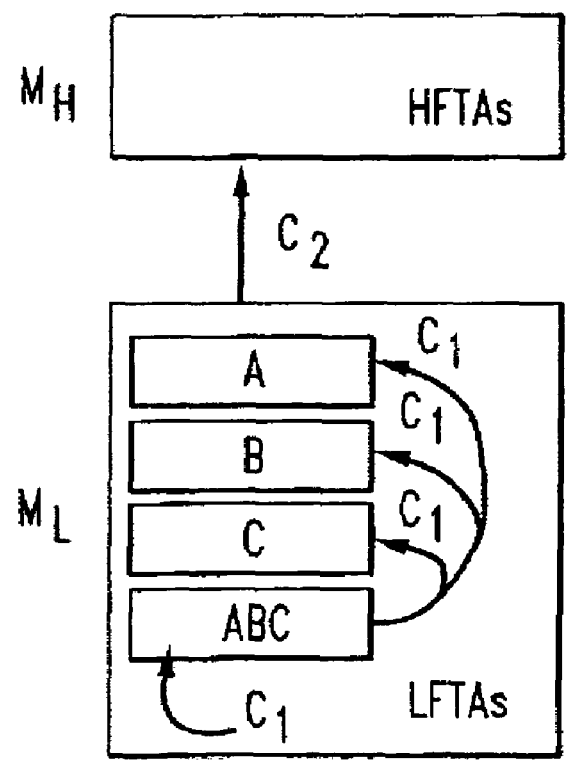
FIG. 2 depicts processing multiple aggregation queries sharing the computation that is common to each one.

FIG. 2 depicts processing multiple aggregation queries sharing the computation that is common to each one and thereby reduce the overall processing cost. For example, a hash table can be maintained for the relation ABC in $M_L$ as shown in FIG. 2. If given the counts of each group in ABC, the counts of each group of A, B and C can be derived from the hash table. The intuition is that, when a new record arrives, instead of probing three hash tables A, B and C, the hash table ABC would only be probed. The probes on A, B and C can be delayed until the point when an entry is evicted from ABC. The hash tables are omitted when the context is clear. Since the aggregation queries of A, B and C are derived from hash table ABC, ABC is described as feeding A, B and C. Although ABC is not of interest to the user, the maintenance can help reduce the overall cost. This relation can be referred to as a phantom. A, B and C, whose aggregate information is of user interest, are each called a query. Both queries and phantoms are called relations.

Consider the cost for processing n records. Without the phantom, three hash tables are probed for each incoming record, wherein $x_1 n$ evictions from each table occur. The total cost is, therefore:

$$E_1 = 3nc_1 + 3x_1 nc_2 \quad (1)$$

With a phantom, only hash table ABC is probed for each incoming record, wherein $x_2 n$ evictions occur. For each of these evictions, a probe A, B and C is done. Hence $x'_1 x_2 n$ evictions are derived from each probe. The total cost is:

$$E_2 = nc_1 + 3x_2 nc_1 + 3x'_1 x_2 nc_2 \quad (2)$$

Comparing Equations 1 and 2, difference of $E_1$ and $E_2$ is as follows:

$$E_1 - E_2 = [(2-3x_2)c_1 + 3(x_1 - x'_1 x_2)c_2 i]n \quad (3)$$

If $x_2$ is small enough so that both $(2-3x_2)$ and $(x_1-x'_1 x_2)$ are larger than 0, $E_2$ will be smaller than $E_1$; therefore, instantiation of the phantom benefits the total cost. If $x_2$ is not small enough so that one of $(2-3x_2)$ and $(x_1-x'_1 x_2)$ is larger than 0 but the other is less than 0, $E_1-E_2$ depends on the relationship of $c_1$ and $c_2$.

Figure 3:
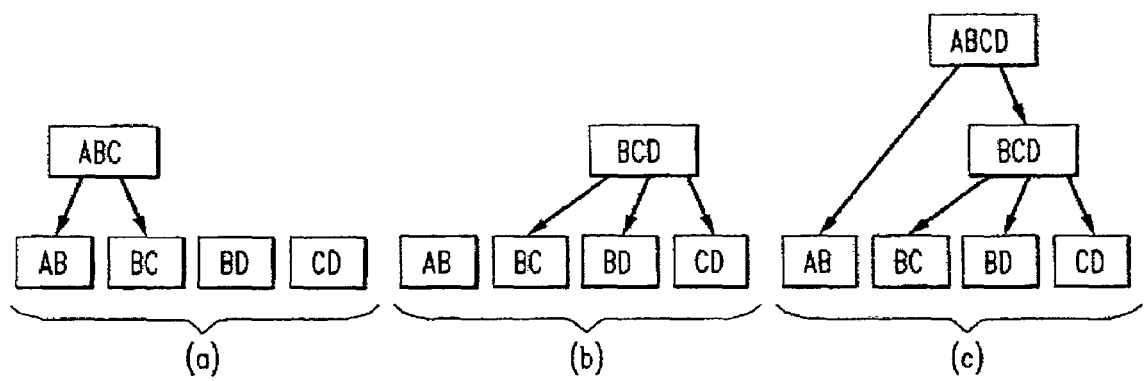
FIG. 3 depicts three examples of phantom query tree usable with the present embodiments.
Figure 4:
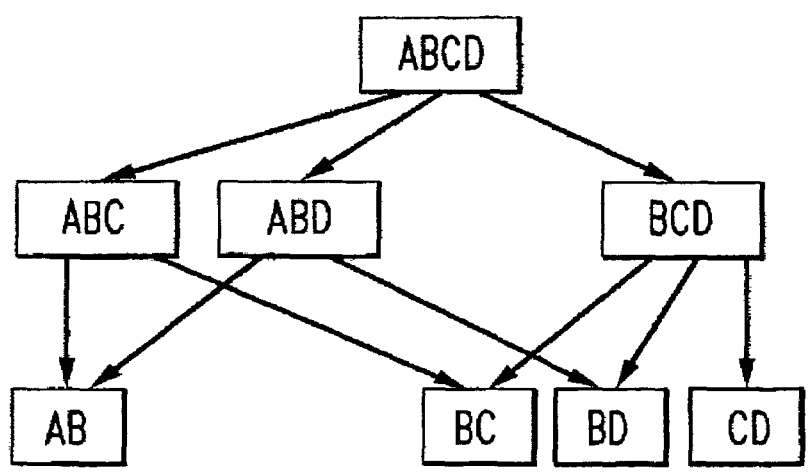
FIG. 4 depicts an example of a phantom query graph.

In reference to FIG. 3 and FIG. 4, for stream relation R with four attributes A, B, C, and D, the queries are AB, BC, BD and CD. Phantom ABC can be initiated, wherein phantom ABC feeds AB and BC as shown in FIG. 3. A shaded box is a phantom and a non-shaded box is a query. Alternatively, phantom BCD can be initiated, wherein phantom BCD feeds BC, BD and CD as shown in FIG. 3. Further, phantom BCD and phantom ABCD can be initiated, wherein ABCD feeds AB and BCD as shown in FIG. 3. Only three alternatives are discussed, but many other possibilities can be performed. A phantom that feeds less than two relations is never beneficial. So by combining two or more queries, all possible phantoms can be obtained and can be plotted in a relation feeding graph as in FIG. 4. Each node in the graph is a relation and each directed edge shows a feed relationship between two nodes, that is, the parent feeds the child. The feed relationship can be "short circuited", that is, a node can be directly fed by any of its ancestors in the graph. For example, AB can be fed directly by ABCD without having ABC or ABD instantiated.

Aggregation queries usually include a specification of temporal epochs of interest. For example, in the query "for every destination IP, destination port and 5 minute interval, report the average packet length", the "5 minute interval" is the epoch of interest. During stream processing within an epoch (e.g., a specific 5 minute interval), the aggregation query hash tables need to be maintained, for each record in the stream. At the end of an epoch, all the hash tables of the user queries at the LFTA need to be evicted to the HFTA to complete the user query computations. Thus, two components to the cost exists: intra-epoch cost, and end-of-epoch cost.

Intra-Epoch Cost—Let $E_m$ is the maintenance cost of all the hash tables during an epoch T, the maintenance cost for short. $E_m$ includes updating all hash tables for the raw relations when a new record in the stream is processed. If (and only if) a collision in hash tables for the raw relations occurs, the hash tables of the relations they feed are updated. This process repeats until the hash tables for the leaf level. Each of these updates has a cost of $c_1$.

If there are collisions in the hash tables for the leaf (user) queries, evictions to the HFTAs are incurred; each with the cost of $c_2$. The total maintenance cost is, therefore,:

$$E_m = \sum_{R\epsilon I} \Im_R c_1 + \sum_{R\epsilon L} \Im_R x_R c_2 \quad (4)$$

I is a configuration; L is the set of all leaves in I; $F_R$ is the number of tuples fed to relation R during epoch T; and $x_R$ is the collision rate of the hash table for R. $F_R$ is derived as follows.

$$\Im_R = \begin{cases} n_T & \text{if } R\epsilon W \\ \Im_a x_a & \text{else} \end{cases} \quad (5)$$

W is the set of all raw relations; $n_T$ is the number of tuples observed in T; $F_a$ is the number of tuples fed to the parent of R in I; and $x_a$ is the collision rate of the hash table for the parent of R in I. If $F_a = n_T$ and $x_a = 1$ when R is a raw relation, Equation 4 can be rewritten as follows.

$$E_m = \left[ \sum_{R\epsilon I} \left( \prod_{R'\epsilon A_R} x'_R \right) c_1 + \sum_{R\epsilon L} \left( \prod_{R'\epsilon A_R} x'_R \right) x_R c_2 \right] n_T \quad (6)$$

$A_R$ is the set of all ancestors of R in I. The term $n_T$ is determined by the data stream and is not affected by the configuration. The per record cost is:

$$e_m = \left[ \sum_{R\epsilon I} \left( \prod_{R'\epsilon A_R} x'_R \right) c_1 + \sum_{R\epsilon L} \left( \prod_{R'\epsilon A_R} x'_R \right) x_R c_2 \right] \quad (7)$$

The terms $c_1$ and $c_2$ are constants determined by the LFTA/HFTA architecture of the DSMS. The cost is only affected by the feeding relationship and collision rates of the hash tables.

End-of-Epoch Cost—The update cost at the end of epoch T as $E_u$ (the update cost for short) includes the cost of the following operations. From the raw level to the leaf level of the feeding graph of the configuration, each hash table is scanned. Each item in the hash table is propagated to hash tables of the lower level relations they feed. Finally, the leaf level hash table is scanned and each item in the leaf level hash table is evicted to the HFTA, $M_H$. Using an analysis similar to the one for intraepoch costs and taking the possibilities of collisions during this phase into account, the update cost $E_u$ can be expressed as follows:

$$\sum_{R\epsilon I, R\epsilon W} \left[ \sum_{R'\epsilon A_R} \left( M_{R'} * \prod_{R''\epsilon A_{R'} \sim R', R'' \notin W} x''_R \right) \right] c_1 + \quad (8)$$

$$\sum_{R\epsilon L} \left[ M_{R'} + \sum_{R\epsilon A_R} \left( M_R * \prod_{R''\epsilon A_{R'} \sim R', R'' \notin W} x''_R \right) \right] c_2$$

$M_R$ is the size of the hash table of relation R, and W is the set of all raw relations.

The present embodiments involve picking the right kind of phantom query. In picking the right phantom query, the system aggregates the user queries. The present embodiments provide a cost savings because of the two level architecture, but the present embodiments are not dependent on a two level architecture.

A user is interested in source IP, or source IP and destination IP, or source IP and source Port. The standard query technique stores and searches these separately. The present embodiments use phantom queries to discover the new search that was not originally asked for, but the output from the phantom can be used to create the answer to the user query.

While these embodiments have been described with emphasis on the embodiments, it should be understood that within the scope of the appended claims, the embodiments might be practiced other than as specifically described herein.

What is claimed is:

1. A datastream management system comprising:
   a. a filter transform aggregate for managing a high speed input data stream with a plurality of packets, wherein each packet comprises at least one attribute, and wherein the filter transform aggregate comprises:
      i. an evaluation system to evaluate the high speed input data stream and to partition the plurality of packets into groups using similar attributes;
      ii. a table to store the attributes of the plurality of packets using a hash function; and
      iii. computer instruction to form a phantom query, wherein the phantom query uses a partitioned group of packets with attributes different than those used to group the plurality of packets into groups for solving user queries without performing the user queries on the high speed input data stream;
   b. a memory storing the filter transform aggregate; and
   c. a processor operating the filter transform aggregate.

2. The system of claim 1, wherein the attributes are source IP addresses, source ports, destination ports, destination IP addresses, time lengths, or combinations thereof 3. The system of claim 1, wherein the evaluation system is an SQL evaluation system, an Oracle evaluation system, or combinations thereof.

4. The system of claim 1, wherein the filter transform aggregate further comprises a low level filter transport aggregate and a high level filter transform aggregate.

5. The system of claim 1, wherein the filter transform aggregate comprises from about 10,000 packets to about 1,000,000 packets.

6. The system of claim 1, wherein the phantom query comprises a member selected from the group consisting of a request for source port, a request for destination port, an IP destination address, IP origination address, and combinations thereof.

7. The system of claim 1, wherein the user queries are performed on an output from the phantom query.

8. A memory storing a set of instructions executable by a processor, the instructions operable to:
   a. create a filter transform aggregate;
   b. administer a data stream with a plurality of packets, using the filter transform aggregate, wherein each packet comprises a plurality of attributes;
   c. perform an evaluation on the data stream and partition the plurality of packets into groups by based on similar attributes;
   d. apply a hash function to create a table in memory based on the attributes of the plurality of packets; and
   e. make a phantom query for a defined partitioned group of packets using attributes other than those used to group the packets, to simultaneously solve at least two user queries by applying a phantom query to the high speed data stream.

9. The memory of claim 8, wherein the step of creating the filter transform aggregate comprises creating a low level filter transform aggregate and a high level filter transform aggregate.

10. The memory of claim 8, wherein the step of creating the filter transform aggregate further comprises creating at least three levels of filter transform aggregates.

11. The memory of claim 8, wherein the filter aggregate comprises from about 10,000 packets to about 1,000,000 packets.

12. The memory of claim 8, wherein the at least two user queries are performed on an output from the phantom query.

13. The memory of claim 8, wherein the data stream is a high speed input data stream.

14. The memory of claim 8, wherein the evaluation is performed by an SQL evaluation system, an Oracle evaluation system, or combinations thereof.

15. The memory of claim 8, wherein the attributes are source IP addresses, source ports, destination ports, destination IP addresses, time lengths, or combinations thereof.

16. The memory of claim 8, wherein the phantom query comprises a member selected from the group consisting of a request for source port, a request for destination port, an IP destination address, IP origination address, and combinations thereof.

17. A memory storing a set of instructions executable by a processor, the instructions operable to:
   a. create a low level filter transform aggregate;
   b. create a high level filter transform aggregate;
   c. administer a high input data stream with a plurality of packets, wherein each packet comprises a plurality of attributes;
   d. perform an evaluation on the high input data stream, and partition the plurality of packets into groups by an attribute;
   e. create a table in memory based on the attributes of each packets using a hash function; and
   f. make a phantom query for a partitioned group of packets using attributes different than those used to group the plurality of packets to solve simultaneously at least two user queries by applying the phantom query to the high input data stream.

18. The memory of claim 17, wherein the at least two user queries are performed on an output from the phantom query.

19. The memory of claim 17, wherein the attributes comprise a member selected for the group consisting of: source IP addresses, source ports, destination ports, destination IP addresses, time lengths, and combinations thereof.

20. The memory of claim 17, wherein the phantom query comprises a member selected from the group consisting of a request for source port, a request for destination port, an IP destination address, IP origination address, and combinations thereof.

* * * * *